United States Patent [19]

Westerman, Jr.

[11] Patent Number: 4,581,188
[45] Date of Patent: Apr. 8, 1986

[54] TRANSFER APPARATUS FOR A MOLDING PRESS

[75] Inventor: Harry H. Westerman, Jr., Danville, Ind.

[73] Assignee: RCA Corporation, Princeton, N.J.

[21] Appl. No.: 761,871

[22] Filed: Aug. 2, 1985

Related U.S. Application Data

[63] Continuation of Ser. No. 652,008, Sep. 19, 1984.

[51] Int. Cl.⁴ .............................................. B29D 17/00
[52] U.S. Cl. ................................ 264/107; 425/436 R; 425/810; 425/502; 249/219 R
[58] Field of Search ............... 425/501, 509, 511, 116, 425/810, 502, 436 R; 264/107

[56] References Cited

U.S. PATENT DOCUMENTS

| | | | |
|---|---|---|---|
| 2,743,478 | 5/1956 | Harlow et al. | 18/5.3 |
| 2,853,737 | 9/1958 | Harlow | 18/5.3 |
| 3,514,813 | 6/1970 | Westerman | 18/5.3 |
| 3,528,127 | 9/1970 | Damm et al. | 18/5.3 |
| 3,662,051 | 5/1972 | Harlow et al. | 264/107 |
| 3,702,749 | 11/1972 | Flusfeder et al. | 425/109 |
| 3,833,328 | 9/1974 | Palmer et al. | 425/308 |
| 3,862,815 | 1/1975 | Roczynski et al. | 425/116 |
| 4,005,965 | 2/1977 | Roczynski et al. | 425/315 |

Primary Examiner—J. Howard Flint, Jr.

Attorney, Agent, or Firm—Birgit E. Morris; Edward J. Sites

[57] ABSTRACT

A transfer apparatus is provided for advancing a molded article from the molding station to the flash trimming station of an automated molding press. The transfer apparatus is comprised of a support member having a retainer and an expandable clamp member. The expandable clamp member is mounted within the retainer. The expandable clamp member, in its fully expanded position, has an interior size sufficient to hold a molded article by flash formed about the outer edge of the molded article. In the contracted position, the clamp has an inner edge larger than the size of the flash formed about the outer edge of the article. The transfer apparatus is pivotally mounted to oscillate between the molding station and the flash trimming station. In use, the transfer apparatus is positioned with the clamp member in the fully expanded position between the molds of the molding station so as to form a molding surface against which the flash can be molded in a uniform configuration. After the article is molded, the transfer apparatus, with the clamp member still in the expanded position, is oscillated to a position which is in alignment with the flash trimming station. The clamp member is then contracted which releases the flash and, as a result, the article. The transfer apparatus then returns to the molding station for the next molding cycle.

12 Claims, 8 Drawing Figures

TRANSFER APPARATUS FOR A MOLDING PRESS

This is a continuation of U.S. Pat. No. 4,652,008 filed Sept. 19, 1984.

This invention relates to an apparatus for transferring a molded article from the molding station to the flash trimming station of an automated molding press.

BACKGROUND OF THE INVENTION

Molded articles, such as audio and high density information records and the like, are manufactured by molding a plastic composition between a pair of mold halves which have formed in their molding surfaces a negative pattern corresponding to the shape of the desired molded article. A charge of a plastic molding composition, which is somewhat in excess of that actually required to mold the article, is used to insure that the molded article will be free of voids and low density areas. During the molding of the article, the excess amount of the plastic composition is forced out from between the molds and forms a ring of material referred to as flash about the outer edge of the article. The molded article, with the flash still attached, is removed from the molds and the flash is then trimmed from the article.

When a large number of molded articles are to be produced, they are generally molded with an automated molding press which includes a molding station and a flash trimming station. A charge of a plastic composition placed between a pair of molds mounted in the molding station is pressed into the desired configuration. The resulting molded article is then transferred to the flash trimming station for removal of the flash. Each of the steps in the automated molding process generally take place simultaneously, that is, while one article is being molded, another article is being trimmed. In the operation of an automated molding press, it is important that there be a precisely timed and accurate transfer of in-process parts. Considerable problems in timing and accurate transfer are, however, encountered with automated molding presses, many of which can be traced directly or indirectly to the apparatus used to transfer untrimmed molded articles from the molding station to the flash trimming station. Non-uniform flash, a problem normally caused by the molding process per se, or by the transfer apparatus, or a combination of both, can, for example, cause considerable problems in trimming the flash from the molded article when the cutter blade of the flash trimming station is brought into contact with the flash. The problems include breakouts, edge cracking, and the like.

What would be highly advantageous would be a transfer apparatus for an automated molding press which would result in a uniformly-shaped flash; would securely hold an untrimmed article during transfer from the molding station to the flash trimming station; and would accurately position the article on the flash trimming station.

SUMMARY OF THE INVENTION

A transfer apparatus is provided for advancing a molded article from the molding station to the flash trimming station of an automated molding press. The transfer apparatus is comprised of a support member and an expandable clamp member mounted within the support member. The expandable clamp member, in its fully expanded position, has an inner edge large enough to hold a molded article by the flash formed about the outer edge of the article and, in the contracted position, has an inner edge larger than the size of the flash formed about the outer edge of the article so as to release the article. The transfer apparatus is pivotally mounted to oscillate between the molding station and the flash trimming station. In use, the transfer apparatus is positioned with the clamp member in the fully expanded position between the molds of the molding station so as to form a molding surface against which the flash can be molded in a uniform configuration. After the article is molded, the transfer apparatus, with the clamp member still in the expanded position, is oscillated to a position which is in alignment with the flash trimming station. The clamp member is then contracted which releases the flash and, as a result, the molded article is released. The transfer apparatus then returns to the molding station for the next molding cycle.

DETAILED DESCRIPTION OF THE INVENTION

In describing the present invention, specific reference will be made to an automated press of the type used to mold records, or the like, in order to facilitate the explanation of the invention. This invention, however, is not limited to a record molding press but can be used with other types of automated molding presses.

Figure 1:
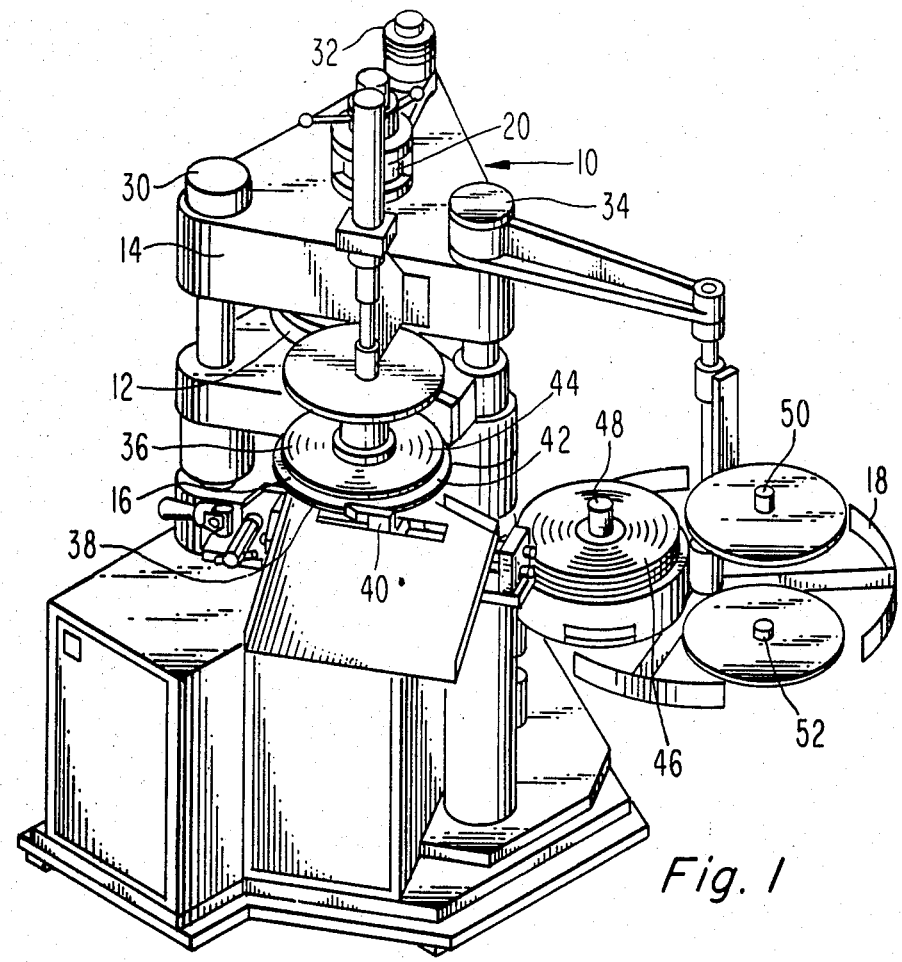
FIG. 1 is a pictorial illustration of an automated molding press of the type used to mold records.

In FIG. 1 there is an illustration of an automated press 10 which includes the transfer apparatus 12 of the present invention. The automated press 10 illustrated in FIG. 1 has a molding station 14, a flash trimming station 16, and an on-machine storage station 18. The molding station 14 includes a central hydraulic ram 20 which is connected to act on the upper and lower molds 22, 24 (not shown in FIG. 1). Record stampers 26, 28 (not shown in FIG. 1) are mounted on the molds 22, 24. The molding station 14, as illustrated, is of a generally triangular shape with support posts 30, 32, 34 at each corner. The transfer apparatus 12 of the invention, which will be described in greater detail hereinafter, is pivotally mounted on one of the posts 34 of the molding station 14. The flash trimming station 16 is positioned adjacent to the molding station 14 so as to receive a molded article with flash formed about its outer edge which, for purposes of illustration, is shown as a molded, untrimmed record 36. The flash trimming station 16 has a support turntable 38 for holding a molded, untrimmed record 36, a cutter 40 positioned to remove the flash 42, and a finished record transport 44 for moving a trimmed record 46 from the flash trimming station 16 to the on-machine storage station 18. As illustrated in FIG. 1, the finished record transport 44 is positioned on the same post 34 as the transfer apparatus 12 and is designed to move in tandem with it. The on-machine storage station 18 has a series of storage positions 48, 50, 52 which move in a circular path to receive the trimmed records 46.

Figure 2:
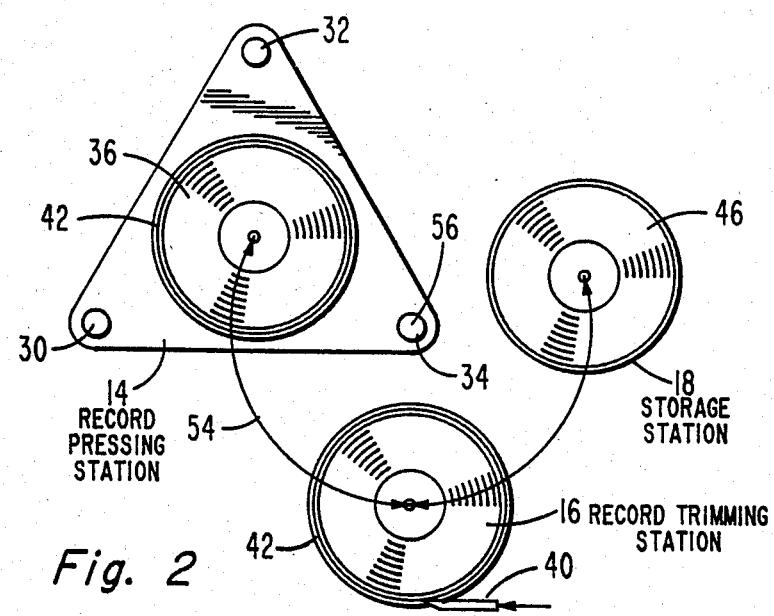
FIG. 2 is a schematic illustration showing the sequence of operations in the automated molding press of FIG. 1.

Referring to FIG. 2, the operation of the automated record press 10 involves a series of interrelated steps. A charge of plastic material (not shown) is delivered to the molding station 14 where it is molded into a record 36 with flash 42 about its outer edge. The molded, untrimmed record 36 is transferred from the molding station 14 to the flash trimming station 16. The transfer apparatus 12 used for this purpose oscillates between the molding station 14 and the flash trimming station 16 along the path defined by the curved arrow 54. The pivot point 56, about which the transfer apparatus 12 oscillates, is in the center of the post 34 of the automated press 10. The post 34 is in a convenient location for mounting the transfer apparatus 12. The transfer apparatus 12 could likewise, however, be mounted at another position, for example, outward from the molding station 14 at a position where the transfer apparatus 12 could still oscillate between the molding station 14 and the flash trimming station 16.

Figure 3:
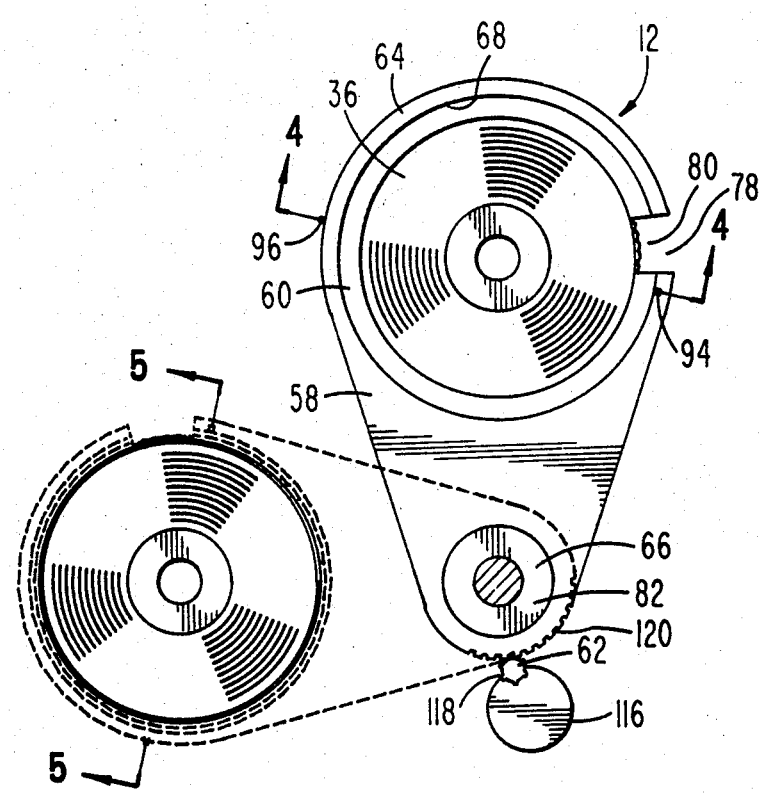
FIG. 3 is a top plan illustration of the transfer apparatus of the invention shown as it is positioned in the molding station and the flash trimming station as indicated by the solid and dotted lines.

In FIG. 3 there is an illustration of the transfer apparatus 12 of this invention. The transfer apparatus 12 is illustrated in solid line in the position it assumes with respect to the molding station 14 and in broken line in the position it assumes with respect to the flash trimming station 16. In addition, in FIG. 3 the transfer apparatus 12 is shown in combination with a molded, untrimmed record 36 which still has the flash 42 about its outer edge.

The transfer apparatus 12 is comprised of three principal components, namely, a support member 58, a clamp member 60, and an oscillation means 62. The support member 58 is made of a rigid material, such as machine tool steel or the like. The support member 58 has opposing end portions 64, 66. The first end portion 64 has a retaining means 68 defined therein. The inner size of the retaining means 68 is substantially larger than the size of the molded record 36 with the flash 42 about its outer edge so that the retaining means 68 is capable of retaining the clamp member 60 during operation of the transfer apparatus 12 in a manner which will be explained in greater detail below. The inner edge 70 of the retaining means 68 includes a groove 72 for receiving and holding in place the clamp member 60. Apertures 74 are provided through the retaining means 68 for tubes 76 to allow passage of an activating medium to and from the clamp member 60.

In the preferred embodiment of this invention, as illustrated in FIG. 3, the first end portion 64 has an open section 78 and the clamp member 60 likewise has an opening 80 which is aligned with the open section 78 of the first end portion 64. The purpose of the aligned open section 78 of the first end portion 64 and the opening 80 in the clamp member 60 is to facilitate the movement of the transfer apparatus 12 into the molding station 14 by allowing planar passage of the transfer apparatus 12 over the molding pins, knockout pins, and associated apparatus of the molding station 14.

The second end portion 66 of the support member 58 includes means for mounting the transfer apparatus 12 for pivotal movement from the molding station 14 to the flash trimming station 16 and back. Various mounting types of apparatus can be used for this purpose. It has been found, however, that the simplest and most reliable method is to form a support bearing collar 82 at the second end portion 66 which is mounted for rotation on one of the support posts 34 of the molding press 10.

The clamp member 60, as noted above, is retained within the retaining means 68. The outer edge 83 of the clamp member 60 is of a size and shape so as to be held in place by the retaining means 68. The inner edge 84 of the clamp member 60 is designed to be expanded and contracted. The inner edge 84 is expandable to a first inner size 86 which is of a size sufficient to engage and grip the flash 42 formed about the outer edge of the molded record 36. In the contracted configuration, the clamp member 60 has a second inner size 90 which is larger than the size of the flash 42 attached to the molded record 36.

Figure 4:
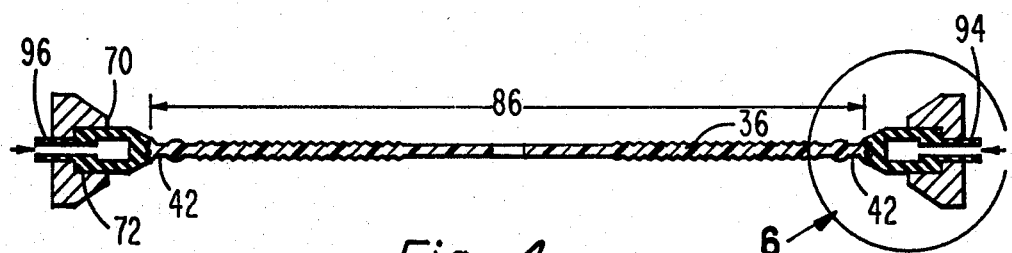
FIG. 4 is a cross-sectional illustration taken as indicated by the line and arrow 4 on FIG. 3.
Figure 5:
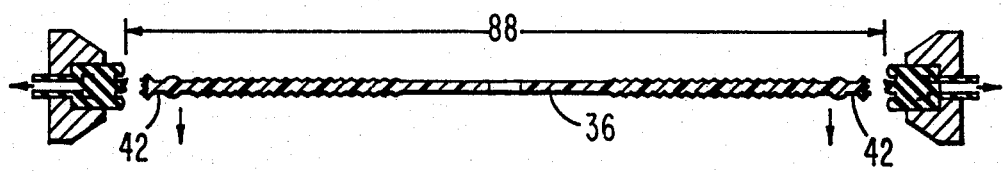
FIG. 5 is a cross-sectional illustration taken as indicated by the line and arrow 5 on FIG. 3.

The clamp member 60 can be expanded or contracted using various types of apparatus. It has been found, however, that the preferred method of expanding and contracting the clamp member 60 is to use internal pressure variation that establishes a positive or negative pressure, i.e., vacuum, within the clamp member 60. In the preferred embodiment, an internal chamber 92 is provided within the clamp member 60. The internal chamber 92 extends the entire length of the clamp member 60 and is sealed except for ports 94, 96 for introducing and removing a medium, such as air or hydraulic fluid, used to expand and contract the clamp member 60. As is best shown in FIG. 4, when the medium is introduced into the internal chamber 92, the clamp member 60 is expanded to its first smaller inner size 86 so as to hold a molded record 36 by the flash 42. However, as shown in FIG. 5, when the medium is removed from the internal chamber 92, the clamp member 60 contracts to the second larger inner size 90, thereby releasing the flash 42 of the molded record 36. This method of operation allows a molded record 36 with flash 42 molded about its outer edge to be securely held during transfer from the molding station 14 to the flash trimming station 16 and then to be readily released.

The clamp member 60 can be made of various materials. Since the clamp member 60 is subjected to repeated flexing as noted above, it is preferable to form the clamp member 60 from a highly elastomeric material, such as a synthetic rubber, and most preferably, a silicone rubber. It has also been found the durometer of the elastomeric material should be about 55–65 in order to obtain optimum results. In order to extend the useful life of the clamp member 60 and to allow the use of higher pressures and vacuums, the clamp member 60 should include a reinforcement, such as a fabric 98, in the areas subject to extreme flexing during operation of the transfer apparatus 12. One of the further important properties used in the selection of the material is the thermal degradation temperature of the material which should be substantially above the temperatures employed in molding the plastic composition.

Figure 6:
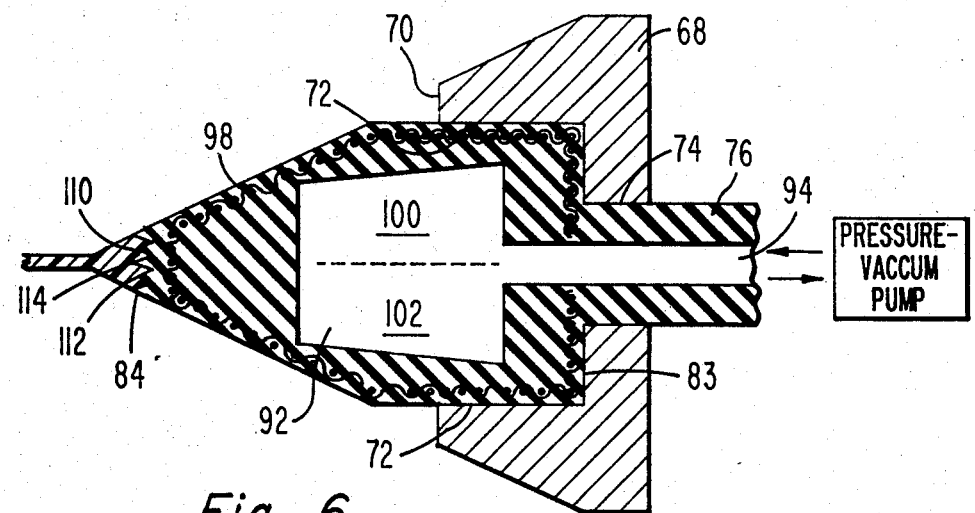
FIG. 6 is an enlarged cross-sectional illustration taken as indicated by the circle 6 on FIG. 4 of one of the embodiments of this invention.
Figure 7:
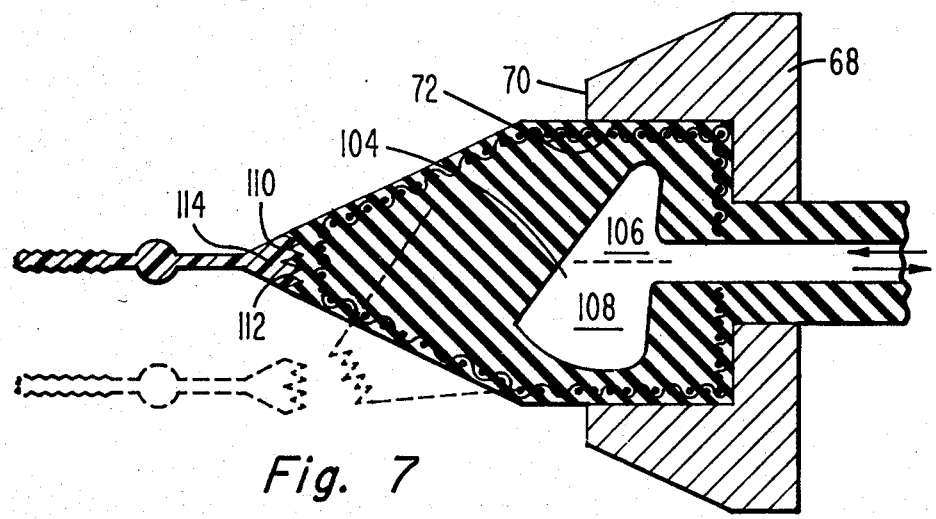
FIG. 7 is an enlarged cross-sectional illustration of an alternate embodiment of the transfer apparatus of this invention with the inner clamp member, when expanded, being shown in solid line and with the clamp member in the contracted position being shown in the dotted line.

The shape of the clamp member 60 is a further important design factor. Initially, the clamp member 60 must be expandable to a first inner size 86 sufficient to grip the flash 42 formed on the molded record 36 and contractable to a second inner size 90, larger than the diameter of the flash 42, so as to release the molded record 36. This relationship is controlled to a large extent by the volume and the configuration of the internal chamber 92 within the clamp member 60 as can best be seen by a comparison of the clamp member 60 in FIGS. 4 and 5. The shape of the internal chamber 92 in the clamp member 60 has a significant influence on the path of movement of the clamp member 60 during expansion and contraction. As seen in FIG. 6, if the internal chamber 92 is symmetrical in shape, that is, if the upper area 100 and lower area 102 of the internal chamber 92 are the same, the clamp member 60 will move radially inwardly and outwardly. The shape of the internal chamber 92 can also be selected so as to cause movement during expansion and contraction along a path which is other than radial to the plane of the transfer apparatus 12. An alternate embodiment of this type is best shown in FIG. 7 wherein the modified internal chamber 104 is of a generally triangular configuration with non-symmetrical upper and lower portions 106, 108. When the clamp member 60 of FIG. 7 is expanded and contracted, the clamp member 60 moves in a somewhat truncated conical path as indicated in FIG. 7. The embodiment of FIG. 7 has certain advantages, such as allowing the molded record 36 being processed to be positively advanced toward the flash trimming station 16 on contraction of the clamp member 60.

In order to further insure a satisfactory grip of the molded record 36 being transferred to the clamp member 60, it is also highly advantageous to provide gripping means 110, such as a series of grooves 112, on the leading edge 114 of the clamp member 60.

The clamp member 60 is connected to a means for expanding and contracting the clamp member 60 which is preferably a pressure-vacuum pump which is capable of producing about 10 PSI pressure ($6.8944 \times 10^5$ dynes/cm$^2$) and about 15 in. (371 mm.) of mercury of vacuum.

The oscillation means 62, as illustrated, is comprised of a motor 116 and gear drive 118 which cooperates with a rack 120 on the support member 58, as shown in FIG. 3, or, alternatively, can be an air cylinder or the like. The function of the oscillation means 62 is to move the support member 58 from the molding station 14 to the flash trimming station 16.

Figure 8:
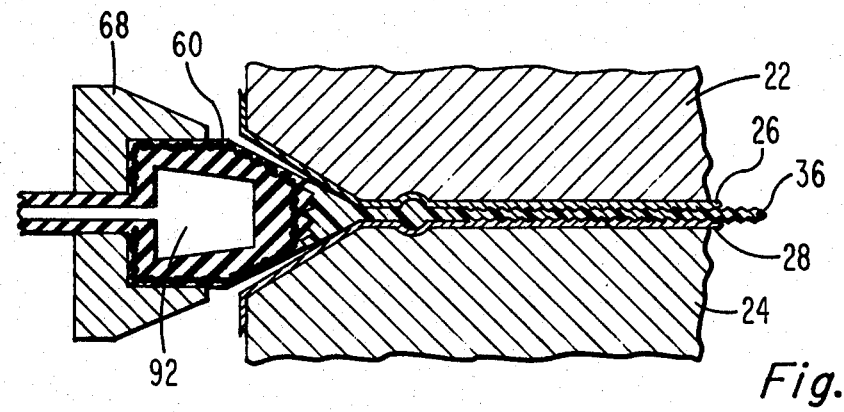
FIG. 8 is a cross-sectional illustration showing the relationship of the transfer apparatus of this invention during molding with respect to the upper and lower molds, the stampers and an article molded with flash on its outer edge.

In operation, the transfer apparatus 12 is positioned in the molding station 14 in alignment with the molds 22, 24 and the stampers 26, 28 as shown on FIG. 8. The clamp member 60 is expanded in alignment with the joint between molds 22, 24 and the stampers 26, 28. A charge of a plastic composition is molded between the stampers 26, 28. The flash 42 flows past the edge of the stampers 26, 28 and is molded against the leading edge 114 of the clamp member 60. The stampers 26, 28 are separated and the resulting flash 42 of the molded record 36 is gripped by the clamp member 60. The support member 58 and the clamp member 60 are rotated by the oscillation means 62 to a point which is in alignment with the flash trimming station 16. The clamp member 60 is contracted which causes the molded record 36 to be released and dropped into position for trimming. The support member 58 and the clamp member 60 are rotated back to the molding station 14 and the cycle is repeated.

The transfer apparatus 12 of this invention has been found in practice to have substantial advantages over the types heretofore generally employed. The control of the grip on the molded article when the clamp member 60 is in the expanded position is quite secure in that the flash 42 is molded against and takes the shape of the clamp member 60. The flash 42 is also uniform in configuration, having been molded against the clamp member 60 which makes trimming of the flash 42 at the flash trimming station 16 significantly simpler. Also, since the clamp member 60 is expanded toward the molds 22, 24 in a uniform manner, it provides a relatively constant volume of flash 42 thereby reducing the amount of excess material required for the flash 42 to a fraction of that hereinbefore required. The transfer apparatus 12 likewise has the advantage that, when collapsed, as in the release position, the molded article is readily released for trimming of the flash 42 from the article.

While the transfer apparatus 12 was described with an automated record press, it can be equally satisfactorily utilized with other shapes of molded articles, especially when the clamp is made of an elastomeric material which can readily be formed into the required configuration.

What is claimed is:

1. In a molding press having a molding station which includes a pair of opposing molds for molding a charge of a plastic material into an article having flash around its outer edge and means for transferring the molded article from the molding station, said transferring means comprising:

a support member, an inflatable clamp member carried on said support member having an inner edge, means for inflating and deflating said clamp member to expand and contract the inner edge of the clamp member to receive the flash to be clamped and to unclamp the flash, and means for moving said support member between a position at the molding station in which the clamp member is around the molds when they are together so that the clamp member will receive the edge of the flash on the molded article and a second position in which the clamp member is away from the molding station.

2. In a molding press having a molding station for molding a charge of a plastic composition into a molded article with flash about the outer edge of the article and a flash trimming station; an apparatus for transferring the molded article by the flash attached about the outer edge of the molded article from the molding station to the flash trimming station comprising:

a support member having first and second opposing end portions; said first end portion having a retaining means and said second end portion including means for mounting said support member for oscillation of the first end portion between the molding station and the flash trimming station;

an inflatable clamp member held by the retaining means, said inflatable clamp member having an inner edge and including means for expanding the inner edge from a first diameter which is sufficient to engage the flash formed about the molded article to a second diameter which is greater than the size of the flash attached to the article; and means associated with the support member for oscillating the support member between the molding station and the flash trimming station.

3. The apparatus according to claim 2 wherein the clamp member includes an internal chamber which is in communication with a port for insertion and removal of a medium for expanding and contracting the clamp member.

4. The apparatus according to claim 3 wherein the internal chamber has a symmetrical cross-section to provide expansion and contraction of the inner edge from the first diameter to the second diameter in a path radial to the support member.

5. The apparatus according to claim 3 wherein the internal chamber has a non-symmetrical cross-section biased to provide movement of the inner edge during contraction of the clamp member to the second inner diameter in a truncated conical path.

6. The apparatus according to claim 3 wherein the clamp member is comprised of an elastomeric material.

7. The apparatus according to claim 6 wherein the elastomeric material is reinforced about the internal chamber.

8. The apparatus according to claim 6 wherein the elastomeric material has a degradation temperature which is higher than the temperature employed in the molding of the plastic composition.

9. The apparatus according to claim 2 wherein the inner edge includes means for releaseably engaging the flash.

10. The apparatus according to claim 2 wherein the support member and the clamp member have aligned openings therein for facilitating oscillation of the apparatus into the molding station.

11. The method of transferring a molded article with flash formed about its outer edge from a molding station to a second station of a molding press, said method comprising the step of:
providing an inflatable clamp member having an inner edge expandable to a first diameter sufficient to engage the flash and contractable to a second diameter larger than the diameter of the flash formed about the article;
positioning the clamp member within the molding station with the inner edge in alignment with the area where flash is formed on a molded article;
expanding the inner edge to the first diameter;
molding a charge of a plastic composition into an article having flash formed about its outer edge with the flash in engagement with the inner edge of the clamp member;
moving the clamp member from the molding station to the second station; and
contracting the inner edge of the clamp to the second diameter to release the molded article.

12. The method according to claim 1 which comprises inserting and removing a medium from an internal chamber for expanding and contracting the inner edge respectively.

* * * * *